(12) United States Patent
Hermange et al.

(10) Patent No.: US 12,183,482 B2
(45) Date of Patent: Dec. 31, 2024

(54) CONNECTION ARRANGEMENT WITH A FLEXIBLE FLAT CABLE

(71) Applicant: SAINT-GOBAIN GLASS FRANCE, Courbevoie (FR)

(72) Inventors: François Hermange, Aachen (DE); Robin Spanjers, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 52 days.

(21) Appl. No.: 17/794,169

(22) PCT Filed: Feb. 5, 2021

(86) PCT No.: PCT/EP2021/052879
§ 371 (c)(1),
(2) Date: Jul. 20, 2022

(87) PCT Pub. No.: WO2021/156485
PCT Pub. Date: Aug. 12, 2021

(65) Prior Publication Data
US 2023/0352208 A1 Nov. 2, 2023

(30) Foreign Application Priority Data
Feb. 7, 2020 (EP) .................................... 20156204

(51) Int. Cl.
*H01B 7/08* (2006.01)
*B32B 17/10* (2006.01)
(Continued)

(52) U.S. Cl.
CPC ......... *H01B 7/08* (2013.01); *B32B 17/10036* (2013.01); *B32B 17/10293* (2013.01);
(Continued)

(58) Field of Classification Search
CPC ...................................................... H01B 7/08
See application file for complete search history.

(56) References Cited

U.S. PATENT DOCUMENTS

| 3,805,213 A | * | 4/1974 | Austin | H05K 1/118 |
| | | | | 174/117 FF |
| 7,710,406 B2 | * | 5/2010 | Fujii | G06F 3/045 |
| | | | | 345/173 |

(Continued)

FOREIGN PATENT DOCUMENTS

| DE | 93 13 394 U1 | 10/1993 |
| DE | 42 35 063 A1 | 4/1994 |

(Continued)

OTHER PUBLICATIONS

International Search Report as issued in International Patent Application No. PCT/EP2021/052879, dated Jun. 9, 2021.
(Continued)

*Primary Examiner* — Chau N Nguyen
(74) *Attorney, Agent, or Firm* — Pillsbury Winthrop Shaw Pittman LLP (57) ABSTRACT

A connection arrangement includes a composite pane composed of a first pane and a second pane, which are connected to an intermediate layer, two electrically conductive structures, in particular two mutually opposed surface electrodes of an electro-optical functional element that are arranged between the first pane and the second pane, and a flexible flat cable having electrical conductor tracks, includes a first connection region at a first end and on a first side of the flat cable, wherein the first connection region has a contact point of at least one conductor track, at least one second connection region at the first end and on the first side of the flat cable, wherein the second connection region has a contact point of at least one conductor track, and a third connection
(Continued)

region with contact points of the conductor tracks at a second end of the flat cable.

17 Claims, 6 Drawing Sheets

(51) Int. Cl.
    *B32B 27/08*     (2006.01)
    *B32B 27/36*     (2006.01)
    *H01B 7/04*     (2006.01)
    *H01B 13/00*     (2006.01)

(52) U.S. Cl.
    CPC .. *B32B 17/10504* (2013.01); *B32B 17/10761* (2013.01); *B32B 27/08* (2013.01); *B32B 27/36* (2013.01); *H01B 7/04* (2013.01); *H01B 13/0036* (2013.01); *B32B 2255/10* (2013.01); *B32B 2255/20* (2013.01); *B32B 2307/202* (2013.01); *B32B 2457/00* (2013.01)

(56) References Cited

U.S. PATENT DOCUMENTS

| | | | |
|---|---|---|---|
| 2001/0011603 A1* | 8/2001 | Ueno | H01B 7/0823 |
| | | | 174/117 FF |
| 2005/0191872 A1* | 9/2005 | Tanabe | H05K 1/118 |
| | | | 439/67 |
| 2016/0036151 A1* | 2/2016 | Tominaga | H01R 43/16 |
| | | | 29/874 |
| 2018/0301832 A1 | 10/2018 | Coakley et al. | |
| 2020/0412062 A1* | 12/2020 | Minoru | H01R 12/727 |

FOREIGN PATENT DOCUMENTS

| | | |
|---|---|---|
| DE | 199 60 450 C1 | 5/2001 |
| DE | 20 2004 019286 U1 | 4/2006 |
| DE | 10 2005 007427 A1 | 8/2006 |
| DE | 10 2005 049081 B3 | 6/2007 |
| DE | 10 2007 027296 A1 | 12/2008 |
| DE | 10 2008 026339 A1 | 12/2009 |
| DE | 20 2008 017611 U1 | 4/2010 |
| DE | 10 2013 001334 A1 | 7/2014 |
| EP | 0 876 608 B1 | 4/2002 |
| EP | 0 847 965 B1 | 10/2004 |
| JP | H10-253995 A | 9/1998 |
| JP | 2005-317912 A | 11/2005 |
| JP | 2018-058747 A | 4/2018 |
| WO | WO 2011/033313 A1 | 3/2011 |
| WO | WO 2011/105062 A1 | 9/2011 |
| WO | WO 2012/052315 A1 | 4/2012 |
| WO | WO 2014/019780 A1 | 2/2014 |
| WO | WO 2014/029536 A1 | 2/2014 |

OTHER PUBLICATIONS

Notice of Reasons for Rejection as issued in Japanese Patent Application No. 2022-547762, dated Aug. 8, 2023.
Decision of Final Rejection as issued in Japanese Patent Application No. 2022-547762, dated Feb. 13, 2024.

* cited by examiner

CONNECTION ARRANGEMENT WITH A FLEXIBLE FLAT CABLE

CROSS-REFERENCE TO RELATED APPLICATIONS

This application is the U.S. National Stage of PCT/EP2021/052879, filed Feb. 5, 2021, which in turn claims priority to European patent application number 20 156 204.8 filed Feb. 7, 2020. The content of these applications are incorporated herein by reference in their entireties.

The invention relates to a connection arrangement with a flexible flat cable having electrical conductor tracks, as well as a method for production thereof and use thereof.

Flexible flat conductors, also called ribbon conductors or foil conductors, are widely used in vehicle construction, in particular to enable movable, electrical contacting under limited space conditions.

In the vehicle sector, flat conductors are used, for example, for contacting electrically functional layers in composite glass panes. Examples are found in DE 42 35 063 A1, DE 20 2004 019 286 U1, or DE 93 13 394 U1.

Such composite glass panes generally consist of at least two rigid individual glass panes that are adhesively bonded to one another surface-to-surface by a thermoplastic adhesive layer. The thickness of the adhesive layer is, for example, 0.76 mm. Additionally, situated between the individual glass panes are electrically functional layers such as heating coatings and/or antenna elements that are connected to a flat conductor. A flat conductor suitable for this purpose has a total thickness of only 0.3 mm. Such thin flat conductors can easily be embedded between the individual glass panes in the thermoplastic adhesive layer.

The use of flat conductors for contacting electrically functional layers is not restricted to the vehicle sector alone. As known from DE199 60 450 C1, flat conductors are also used in the construction sector. In composite or insulating glass panes, foil conductors are used for electrical contacting of integrated electrical components such as voltage-controlled electrochromic layers, solar cells, heating wires, alarm loops, or the like.

Also known is the use of flat conductors in composite panes with electro-optical functional elements. These are flat structures with electrically adjustable optical properties of an active layer. In other words, the optical properties of the active layer and in particular its transparency, scattering behavior, or luminosity can be controlled by an electrical voltage. Examples of electro-optical functional elements are SPD functional elements (SPD=suspended particle device), known, for example, from EP 0876608 B1 and WO 2011033313 A1, and PDLC functional elements (PDLC=polymer dispersed liquid crystal), known, for example, from DE 102008026339 A1.

Electro-optical functional elements, such as SPD or PDLC functional elements, are commercially available as multilayer film, wherein the active layer is arranged between two surface electrodes that are used to apply a voltage for controlling the active layer. Generally, the two surface electrodes are arranged between two carrier films, typically made of PET. Commercially available multilayer films are also covered on both sides with a protective film made of polypropylene or polyethylene that serves to protect the carrier films against soiling or scratching.

During manufacture of the composite pane, the functional element is cut from the multilayer film in the desired size and shape and inserted between the films of an intermediate layer by means of which two glass panes are laminated to one another to form the composite pane.

Windshields with electrically adjustable sun visors, known, for example, from DE 102013001334 A1, DE 102005049081 B3, DE 102005007427 A1, and DE 102007027296 A1, are a typical application.

Usually, a pane with a complete connection element and a connection region for tool-free connection to further control electronics is required from the manufacturer of the pane.

The electrical contacting of electro-optical functional elements is usually done via bus bars, which are applied to the surface electrodes in the edge region of the functional element and make electrically conductive contact therewith. By connecting the bus bars to an external voltage source, typically via flat conductors (e.g., FFC=flexible flat cable) attached on the bus bars, a voltage is applied to the surface electrodes and the active layer of the functional element is switched.

For more complex control tasks, flexible flat cables that are provided with a plurality of electrical conductor tracks are also used. The electrical conductor tracks are very thin with thicknesses, for example, in the range from 0.03 mm to 0.1 mm and are made, for example, of copper, which has proved itself since it has good electrical conductivity as well as good processability and the material costs are low at the same time.

During the production of the flexible flat cable, the electrical conductor tracks are applied on a carrier substrate made of plastic, for example, using a printing process, and then covered with a covering layer made of plastic. Alternatively, the electrical conductor tracks are prefabricated as metal strips from metal foils and laminated on both sides with a plastic material. In both cases, the electrical conductor tracks are mechanically stabilized and embedded in an insulating sleeve such that they are electrically isolated from the external environment.

If the electrical conductor tracks are applied on a carrier substrate, they are accessible only from the covering layer, since only this can be removed without damaging the electrical conductor tracks. Consequently, such flexible flat cables have only a single contacting side, which corresponds to the side of the covering layer. When two electrical structures opposite one another, like the surface electrodes of an electro-optical functional element, are contacted from two opposite directions, two flexible flat cable are required, one of which is rotated by 180° relative to the other, wherein the flat cables are in each case placed with their contacting side on the electrical structure.

Patent application US 2018/0301832 A1 discloses folded-over electrical conductor tracks.

The object of the present invention consists in providing an improved connection arrangement having a flexible flat cable, wherein the flat cable is suitable for common contacting of mutually opposite electrical structures from two opposite directions and, at the same time, can be produced simply and economically.

According to the proposal of the invention, these and other objects are accomplished by a connection arrangement with a flexible flat cable in accordance with claim 1. Preferred embodiments are apparent from the subclaims. A method for their production as well as the use of the connection arrangement according to the invention with a flexible flat cable are apparent from the coordinate claims.

The invention relates to a connection arrangement with a flexible flat cable, which comprises:

a composite pane composed of a first pane and a second pane, which are connected to an intermediate layer, two electrically conductive structures that are arranged between the first pane and the second pane, and a flexible flat cable, whose first connection region is electrically conductively, and in particular, galvanically, connected to one electrically conductive structure and whose second connection region is electrically conductively, and in particular, galvanically, connected to the other electrically conductive structure, wherein the flat conductor is routed out of the composite pane and the third connection region is arranged outside the composite pane.

The flexible flat cable comprises a plurality of electrical conductor tracks (conductor strips), on which, at least on one side, an electrical insulation layer made of plastic is arranged. Advantageously, the electrical conductor tracks are sheathed by an electrical insulating sleeve. The flexible flat cable is used for electrical connection to at least two electrical structures, which are preferably arranged opposite one another and are to be electrically contacted from two opposite sides (directions).

The flexible flat cable is a flat body with two opposite sides that can be shaped either flat or curved. In the flat (i.e., non-curved) state, the flat conductor is arranged in one plane. The flexible flat cable is generally elongated and has two ends along its direction of extension.

The electrical conductor tracks are arranged adjacent one another, at least in some sections. Each electrical conductor track can be electrically contacted at two contact points spaced apart from one another along the conductor track. The contact points are regions of the conductor tracks at which electrical contacting is possible. In the simplest embodiment, these are accessible regions of the electrical conductor tracks.

The flat cable is an elongated electrical component with multiple electrical conductor tracks, whose width is considerably greater than the thickness. The flat cable is thin enough (i.e., the thickness is low enough) that it is flexible and bendable.

The flexible flat cable includes a first connection region that is situated along the direction of extension of the flat cable at a first end and on a first side of the flat cable. In particular, the first connection region is situated only on the first side of the flat cable. The first connection region has a contact point of at least one of the electrical conductor tracks.

The flexible flat cable further includes at least one second connection region, which is also situated at the first end (i.e., at the same end as the first connection region) and on the first side (i.e., on the same side as the first connection region) of the flat cable. In particular, the second connection region is situated on only the first side of the flat cable. The at least one second connection region has a contact point of at least one of the electrical conductor tracks.

The flexible flat cable also includes at least one third connection region with contact points of the conductor tracks at a second end of the flat cable in the direction of extension of the flat cable.

The connection regions of the flat cable are used for electrical contacting of the conductor tracks, for which purpose the insulating sleeve is not present or is removed at least at the contact points such that the conductor tracks are accessible. It is essential here that the contact points of the conductor tracks in the first connection region and the second connection region are situated on one and the same side of the flat cable. This is typically the case, in particular when the electrical conductor tracks are applied on a carrier substrate, for example, using a printing process, such that only openings (through-holes) in the covering layer can be formed without damaging the conductor tracks.

The flexible flat cable has a base section containing the first connection region and at least one strip-like section connected to the base section (strip section), which has the second connection region. In this case, the strip-like section is or can be folded over as part of the flexible flat cable such that the second connection region faces the first connection region. The at least one strip-like section is preferably elongated. Likewise, the base section is preferably elongated.

The first connection region and the second connection region are arranged on the same side of the flat cable, i.e., the two connection regions do not face one another when the strip-like section is not folded over. Instead, the two connection regions are arranged on the same side of the flat cable. However, in the folded state, the second connection region is rotated by 180° relative to the non-folded state such that the two connection regions face one another. Both in the non-folded state and in the folded state, the surface normals of the flat cable in the first connection region and the surface normals of the flat cable in the second connection region are parallel to one another.

In this way, opposing electrical structures, in particular two surface electrodes of an electro-optical functional element, can advantageously be electrically contacted by one and the same flat cable. Advantageously, electrical contacting is also possible from two sides, i.e., from two opposite directions. In contrast to the prior art, the use of two separate flat cables can be dispensed with, thus saving material and costs.

In an advantageous embodiment of the flexible flat cable, the strip-like section including the second connection region is arranged at the edge on the base section. This enables particularly easy handling and folding of the strip-like section for contacting the associated electrical structure. It can be advantageous for the strip-like section to protrude laterally from the base section, with the direction of extension of the strip-like section different from a direction of extension of the base section. For example, the strip-like section protrudes from the base section at a right angle.

According to another embodiment of the flexible flat cable, the strip-like section is or can be folded over such that the second connection region is arranged laterally offset relative to the first connection region, i.e., the two connection regions are not opposite one another (viewed perpendicularly through the plane of the flat cable in the non-curved state). Alternatively, it is equally possible for the strip-like section to be foldable or folded such that the second connection region is arranged opposite the first connection region.

According to another embodiment of the flexible flat cable, a depression of a front edge of the flat cable is formed between the base section and the strip-like section. This measure enables particularly simple production of the strip-like section, in particular from conventional flat cables.

According to one embodiment of the flat cable, the electrical conductor tracks are applied on an electrically insulating carrier substrate and thus fixedly connected to the carrier substrate. For example, the carrier substrate is coated with the electrical conductor tracks, in particular using a printing process, for example, screen printing. In addition, the electrical conductor tracks are covered by an electrically insulating covering layer. Together, the carrier substrate and the covering layer form an insulating sleeve that encases the electrical conductor tracks. In this embodiment, the first connection region and the second connection region preferably have no insulation layer only on the side facing away from carrier substrate, at least at the contact points, i.e., the covering layer is removed there, e.g., provided with one or more openings (through-holes).

According to another embodiment of the flat cable, the electrical conductor tracks are prefabricated, for example, as strips of a metal foil, and laminated between two insulation layers of electrically insulating material, which, together, form an insulating sleeve that embeds the electrical conductor tracks. In this embodiment, the first connection region and the second connection region preferably have no insulation layer on only one and the same side, at least at the contact points.

The electrical conductor tracks preferably contain or are made of a metallic material, for example, copper, aluminum, stainless-steel, tin, gold, silver, or alloys thereof. When the electrical conductor tracks are produced as strips of a metal foil, the metal can be tinned in some sections or completely. This is particularly advantageous in order to achieve good solderability with simultaneous corrosion protection. In addition, contacting with an electrically conductive adhesive is improved.

According to one embodiment, the electrical conductor tracks have a thickness of 10 μm to 300 μm, preferably of 30 μm to 250 μm, and in particular of 50 μm to 150 μm. Such thin conductors are particularly flexible and can, for example, be readily laminated in composite panes and routed out of them.

According to one embodiment, the electrical conductor tracks have a width of 0.1 mm to 100 mm, in particular of 1 mm to 50 mm, and in particular of 10 mm to 30 mm. In conjunction with the above-mentioned thicknesses, such widths are particularly suitable for achieving sufficient current-carrying capacity.

The width of the flat cable can be constant or can vary. In particular, the flat cable can be widened in the region of the first connection element, the second connection element, and/or the third connection element and, for example, only in the region of the third connection element.

In an advantageous embodiment of the flat cable, it has a length of 5 cm to 150 cm, preferably of 10 cm to 100 cm, and in particular of 50 cm to 90 cm. It goes without saying that the length, width, and thickness of the flat cable can be adapted to the requirements of the respective individual case.

In the case of a flat cable according to the invention, the direction of the length defines the direction of extension. The length and the width directions span the first side and the second side, opposite the first side. The first side can, for example, also be referred to as the top and the second side can also be referred to as the bottom of the flat cable. The first end and the second end are the ends opposite one another (end regions) of the flat conductor in the direction of extension.

The flexible flat cable has, on one or both sides, an insulation layer, in the form, for example, of an insulating film. The insulation layer is fixedly connected to the electrical conductor tracks and, for example, adhesively bonded. The insulation layer preferably contains or is made of polyimide or polyester, particularly preferably polyethylene terephthalate (PET) or polyethylene naphthalate (PEN). The insulation layer can also consist of an electrically insulating lacquer, preferably a polymeric lacquer. The insulation layer can also contain or be made of thermoplastics and elastomers, such as polyamide, polyoxymethylene, polybutylene terephthalate, or ethylene-propylene diene rubber. Alternatively, potting materials, such as acrylate or epoxy resin systems can be used as an insulation layer.

The insulation layer preferably has a thickness of 10 μm to 300 μm, particularly preferably of 25 μm to 200 μm, and in particular of 60 μm to 150 μm. The insulation layer is, for example, adhesively bonded to the conductor tracks via an adhesive layer. The thickness of the adhesive layer is, for example, from 10 μm to 150 μm and particularly preferably from 50 μm to 75 μm. Such insulation layers are particularly suitable for electrically insulating the conductor tracks and stabilizing them mechanically and protecting them from mechanical damage and corrosion.

In an advantageous embodiment of the flat cable, the conductor tracks are completely sheathed by an insulating sleeve, i.e., there is an insulation layer on both sides of the flat cable, wherein the two insulation layers together form the insulating sleeve. The insulating sleeve can consist in particular of the aforementioned carrier substrate and the covering layer. The insulating sleeve can also be formed by lamination on both sides of the conductor tracks with two insulation layers.

Such flat cables with at least one insulation layer are so thin that they can easily be embedded between the individual panes in the thermoplastic intermediate layer of a composite pane and routed out of it. The flat cable is particularly suitable for contacting electrically conductive structures in composite panes, in particular of opposing surface electrodes of an electro-optical functional element.

In an advantageous embodiment of the flat cable, the flat cable has in the first connection region, in the second connection region, and in the third connection region, no insulation layer or a different electrical insulation. This enables the simple electrical and, in particular, galvanic, contacting of the flat cable. It goes without saying that the connection regions can be protected against corrosion by an electrically conductive coating, such as tinning, or by an electrically nonconductive layer, such as a solder resist. This protective layer is typically not removed, burned, or otherwise penetrated until the time of the electrical contacting, in order to enable electrical contact.

Insulation-free connection regions can be produced by window techniques or by subsequent removal, for example, by laser ablation or mechanical removal. In the window technique, the conductor tracks are coated, for example, glued or laminated, on a carrier substrate by an insulation layer (covering layer) with corresponding cutouts (windows) in the connection regions. Alternatively, the conductor tracks are laminated on both sides, with an insulation layer having corresponding cutouts in the connection regions. In the case of subsequent removal, corresponding cutouts can be introduced into the connection regions in the covering layer if the conductor tracks had been applied on a carrier substrate. In the case of laminated flat cables, cutouts can be introduced into the connection regions in an insulation layer.

The connection regions are designed depending on their respective use. In an advantageous embodiment, the contact points are formed as soldering contact points.

In an advantageous embodiment of the flat cable, one or more through-holes of the insulation layer are provided in each case in the first connection region, in the second connection region, and/or in the third connection region. The through-hole extends completely to the conductor track, i.e., it forms a material-free passage to the conductor track.

In the at least one strip-like section, the flat cable is folded over at at least one point (fold region). This means that the strip-like section between the base section and the second connection region is raised from its plane of extension and routed around such that one side of a part of the strip-like section faces another part of the strip-like section on the same side. Due to the folding, the direction of extension of the strip-like section deviates from its direction of extension before folding.

In an advantageous embodiment of the flat cable, the folding is done at an angle α (alpha). The angle α indicates the deviation of the direction of extension of the part of the strip-like section after the at least one fold region relative to the direction of extension of the part of the strip-like section before the fold region. The angle α (alpha) is preferably from 10° to 170°, particularly preferably from 45° to 135°, even more preferably from 60° to 120°, and in particular from 80° to 100°. The parts of the strip-like section before and after the at least one fold region form, for example, an angle α of 90°. For example, the part of the strip-like section beyond the fold region, i.e., the folded-over part of the strip-like section, and the base section point in the same direction and are parallel to one another. Thus, a particularly compact design of the flat cable can be achieved.

In an advantageous embodiment of the flat cable, the fold of the strip-like section is not sharp edged. Preferably, the fold has a radius of curvature r of 0.1 mm to 100 mm, preferably of 0.5 mm to 10 mm, and in particular of 1 mm to 5 mm. This avoids damage and an increase in the electrical resistance as could be the case with a sharp-edged bend.

The connection arrangement according to the invention comprises a composite pane and two electrically conductive structures that are arranged between the two panes. Preferably, the two electrically conductive structures that are arranged inside a composite pane are two mutually opposed surface electrodes of an electro-optical functional element. In particular, the two surface electrodes are electrically contacted from two opposite sides (directions).

The first and the second connection region are preferably electrically conductively connected in each case to a bus bar, which is, in turn, electrically conductively connected to the electrically conductive structure. The bus bar includes, for example, a strip-shaped or ribbon-shaped metallic conductor, for example, a metal foil. It is also possible to deposit the bus bar on the electrically conductive structure.

The electrically conductive structures are, for example, electrically connected to two voltage connections, which are also referred to as poles (positive or negative pole). In particular, the first connection region and the second connection region are or can be connected to two voltage connections.

The electrical line connection between the connection regions of the flat cable and the electrically conductive structures is preferably made by soldering, bonding, or welding. In the case of soldering, soft soldering with a low-melting solder is preferred. Alternatively, the electrically conductive connection can be made by bonding with an electrically conductive adhesive or by clamping, for example, using a metallic clip, sleeve, or plug connection. Inside the composite pane, the electrical line connection can be made by direct contact of the electrically conductive regions, with this arrangement being fixedly laminated into the composite pane and thus secured against slippage.

The electro-optical functional element is preferably a multilayer film with two outer carrier films. In such a multilayer film, the surface electrodes and the active layer are arranged between the two carrier films. Here, "outer carrier film" means that the carrier films form the two surfaces of the multilayer film. The functional element can thus be provided as a laminated film that can be advantageously processed. The functional element is advantageously protected by the carrier films against damage, in particular, corrosion. The multilayer film contains, in the order indicated, at least one first carrier film, a first surface electrode, an active layer, a second surface electrode, and a second carrier film.

Functional elements as multilayer films are commercially available. The functional element to be integrated is typically cut out of a multilayer film with larger dimensions in the desired shape and size. This can be done mechanically, for example, with a knife. In an advantageous embodiment, the cutting is done by means of a laser. It has been demonstrated that the side edge is more stable in this case than with mechanical cutting. With mechanically cut side edges, there can be a risk that the material will pull back, which is visually conspicuous and negatively affects the aesthetics of the pane.

The first surface electrode and the second surface electrode are in each case formed by an electrically conductive layer. These electrically conductive layers contain at least a metal, a metal alloy, or a transparent conductive oxide, preferably a transparent conductive oxide, and have a thickness of 10 nm to 2 μm. The surface electrodes are preferably transparent. Here, "transparent" means permeable to electromagnetic radiation, preferably electromagnetic radiation of a wavelength of 300 nm to 1300 nm, and, in particular, to visible light. Electrically conductive layers are known, for example, from DE 20 2008 017 611 U1, EP 0 847 965 B1, or WO2012/052315 A1. They typically contain one or more, for example, two, three, or four electrically conductive, functional individual layers. The functional individual layers preferably contain at least one metal, for example, silver, gold, copper, nickel, and/or chromium, or a metal alloy. The functional individual layers particularly preferably contain at least 90 wt.-% of the metal, in particular at least 99.9 wt.-% of the metal. The functional individual layers can be made of the metal or the metal alloy. The functional individual layers particularly preferably contain silver or a silver-containing alloy. Such functional individual layers have particularly advantageous electrical conductivity with, at the same time, high transmittance in the visible spectral range. The thickness of a functional individual layer is preferably from 5 nm to 50 nm, particularly preferably from 8 nm to 25 nm. In this thickness range, advantageously high transmittance in the visible spectral range and particularly advantageous electrical conductivity are achieved.

In principle, the surface electrodes can be formed by any electrically conductive layer that can be electrically contacted.

Preferably, the first carrier film and/or the second carrier film contain at least one polymer that does not fully melt in the autoclave process, preferably polyethylene terephthalate (PET). Particularly preferably, the first and the second carrier film are made of a PET film. This is particularly advantageous in terms of the stability of the multilayer film. However, the carrier films can also contain, for example, ethylene vinyl acetate (EVA) and/or polyvinyl butyral (PVB), polypropylene, polycarbonate, polymethyl methacrylate, polyacrylate, polyvinyl chloride, polyacetate resin, casting resins, acrylates, fluorinated ethylene-propylenes, polyvinyl fluoride, and/or ethylene tetrafluoroethylene. The thickness of each carrier film is preferably from 0.1 mm to 1 mm, particularly preferably from 0.1 mm to 0.2 mm. The carrier films are preferably transparent. The surface electrodes are preferably arranged on one surface of the carrier film, i.e., on exactly one of the two sides of the carrier film (i.e., on its front side or its rear side). The carrier films are oriented in the layer stack of the multilayer film such that the surface electrodes are arranged adjacent the active layer.

In the context of the invention, the term "electrically adjustable optical properties" means those properties that are infinitely adjustable, but also those that can be switched between two or more discrete states.

In addition to the active layer and the surface electrodes, the functional element can have other layers known per se, for example, barrier layers, blocking layers, antireflection layers, protective layers, and/or smoothing layers.

The functional element is integrated between the first pane and the second pane of the composite pane via an intermediate layer. The intermediate layer preferably comprises a first thermoplastic laminating film that bonds the functional element to the first pane and a second thermoplastic laminating film that bonds the functional element to the second pane. Typically, the intermediate layer is formed by at least the first and the second thermoplastic laminating film, which are arranged flat atop one another and are laminated to one another, with the functional element inserted between the two layers. The regions of the laminating films overlapping the functional element then form the regions that bond the functional element to the panes. In other regions of the pane where the thermoplastic laminating films make direct contact, they can fuse during lamination such that the two original layers are no longer discernible and, instead, there is a homogeneous intermediate layer.

A thermoplastic laminating film can, for example, be formed by a single thermoplastic film. A thermoplastic laminating film can also be formed from sections of different thermoplastic films whose side edges are adjacent. In addition to a first thermoplastic laminating film or a second thermoplastic laminating film, additional thermoplastic laminating films can also be present. These can, if need be, also be used for embedding additional films comprising functional layers, for example, infrared-reflecting layers or acoustically damping layers.

The thermoplastic laminating films can also include tinted or colored regions. Such films can be obtained, for example, by coextrusion. Alternatively, a non-tinted film section and a tinted or colored film section can be combined to form a thermoplastic laminating film. The tinted or colored region can be homogeneously colored or tinted, i.e., it can have location-independent transmittance. However, the tinting or coloration can also be inhomogeneous; in particular, a transmittance gradient can be produced.

In a preferred embodiment, the functional element, more precisely the side edges of the functional element, are circumferentially surrounded by a thermoplastic frame film. The frame film is implemented like a frame with a cutout into which the functional element is inserted. The thermoplastic frame film can be formed by a thermoplastic film in which the cutout had been made by cutting. Alternatively, the thermoplastic frame film can also be composed of a plurality of film sections assembled around the functional element. Thus, the intermediate layer is formed, in a preferred embodiment, from a total of at least three thermoplastic laminating films arranged flat one atop another, wherein the frame film, as the middle layer, has a cutout in which the functional element is arranged. During production, the thermoplastic frame film is arranged between the first and the second thermoplastic laminating film, with the side edges of all thermoplastic films preferably situated congruently. The thermoplastic frame film preferably has roughly the same thickness as the functional element. This compensates for the local difference in thickness of the composite pane, which is introduced by the locally limited functional element such that glass breakage during lamination can be avoided.

Automotive glazings, in particular windshields, rear windows, and roof panels, usually have a surrounding peripheral masking print made of an opaque enamel, which serves in particular to protect the adhesive used to install the pane against UV radiation and to visually conceal it. This peripheral masking print is preferably used to also cover the edges of the functional element, which are situated in the edge region of the glazing. The bus bars as well as the necessary electrical connections are also placed in the region of the masking print.

The first thermoplastic laminating film and the second thermoplastic laminating film, as well as, optionally, the thermoplastic frame film, preferably contain at least polyvinyl butyral (PVB), ethylene vinyl acetate (EVA), and/or polyurethane (PU), particularly preferably PVB.

The thickness of each thermoplastic laminating film as well as the frame film is preferably from 0.2 mm to 2 mm, particularly preferably from 0.3 mm to 1 mm, in particular from 0.3 mm to 0.5 mm, for example, 0.38 mm.

The first pane and the second pane are preferably made of glass, particularly preferably soda lime glass, as is common for window panes. However, the panes can also be made of other types of glass, for example, quartz glass, borosilicate glass, or aluminosilicate glass, or of rigid clear plastics, for example, polycarbonate or polymethyl methacrylate. The panes can be clear or also tinted or colored. If the composite pane is used as a windshield, it should have sufficient light transmittance in the central viewing region, preferably at least 70% in the main viewing region A according to ECE-R43.

The outer pane, the inner pane, and/or the intermediate layer can have other suitable coatings that are known per se, for example, antireflection coatings, nonstick coatings, antiscratch coatings, photocatalytic coatings, or solar protection coatings or low-E coatings.

The thickness of the first pane and the second pane can vary widely and thus be adapted to the requirements in the individual case. The first pane and the second pane advantageously have standard thicknesses of 0.7 mm to 25 mm, preferably of 1.4 mm to 2.5 mm for vehicle glass, and preferably of 4 mm to 25 mm for furniture, appliances, and buildings, in particular for electrical heaters. The size of the panes can vary widely and is governed by the size of the application according to the invention. The first and the second pane have, for example, areas customary in the automotive sector and in the architectural sector of 200 $cm^2$ all the way to 20 $m^2$.

A further aspect of the invention includes a method for producing a connection arrangement according to the invention with the following steps:
a) Providing a flat cable,
b) Folding over the strip-like section of the flat cable such that the second connection region faces the first connection region,
c) Electrically conductively connecting the first connection region to one electrically conductive structure and the second connection region to the other electrically conductive structure.

The invention further extends to the use of the connection arrangement according to the invention with a flexible flat cable for contacting electrically conductive structures on or in single pane safety glass panes or multi-pane composite glass panes. Preferably, the flat cable is used for contacting opposing surface electrodes of an electro-optical functional element, for example, an SPD functional element or a PDLC functional element, with contact preferably being made from two opposite directions.

Preferably, the connection arrangement according to the invention is used as a building glazing or vehicle glazing, preferably as a vehicle glazing, in particular as a windshield or a roof panel of a motor vehicle.

The various embodiments of the invention can be implemented individually or in any combinations. In particular, the features mentioned above and those to be explained in the following can be used not only in the combinations indicated, but also in other combinations or in isolation, without departing from the scope of the present invention.

The invention is explained in detail in the following using exemplary embodiments, with reference to the accompanying figures. They depict, in simplified, not-to-scale representation.

Figure 1:
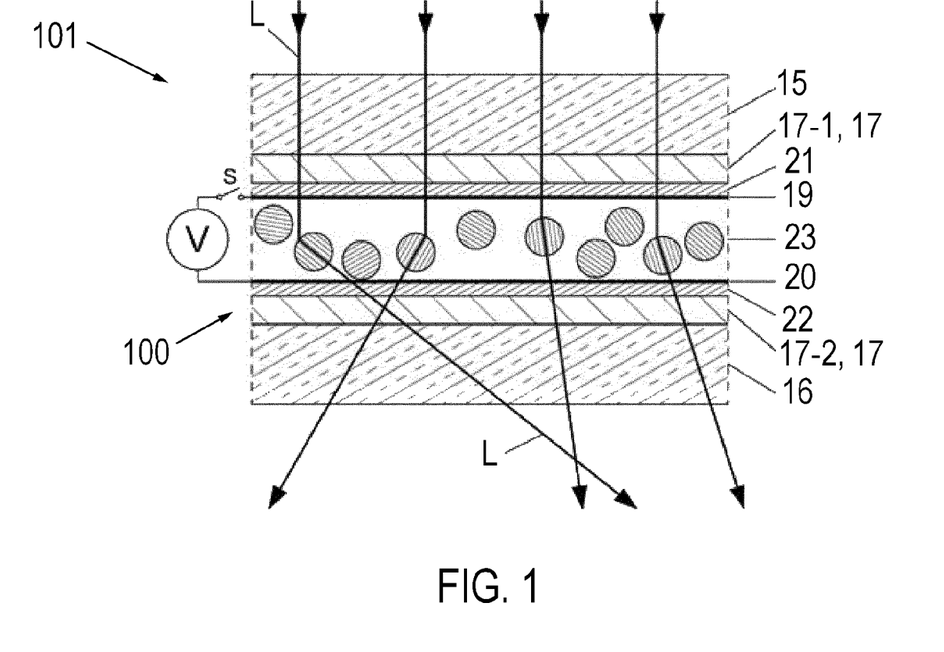
FIG. 1 a schematic sectional view of a connection arrangement according to the invention with a composite pane having a functional element in the nontransparent state, FIG. 2 a schematic sectional view of the connection arrangement of FIG. 1 having a functional element in the transparent state, FIG. 3 a schematic sectional view of the functional element of FIGS. 1 and 2, FIG. 4 a perspective view of the functional element of FIGS. 1 and 2, FIG. 5 a schematic representation of an exemplary embodiment of the flat cable without folding of the strip-like section, FIG. 6 a schematic representation of the flat cable of FIG. 5 with folding of the strip-like section, FIG. 7 a schematic representation of the flat cable of FIG. 6, which is connected to the surface electrodes of the functional element of FIG. 4, FIG. 8 a flow chart of a method according to the invention for producing a connection arrangement according to the invention.
Figure 2:
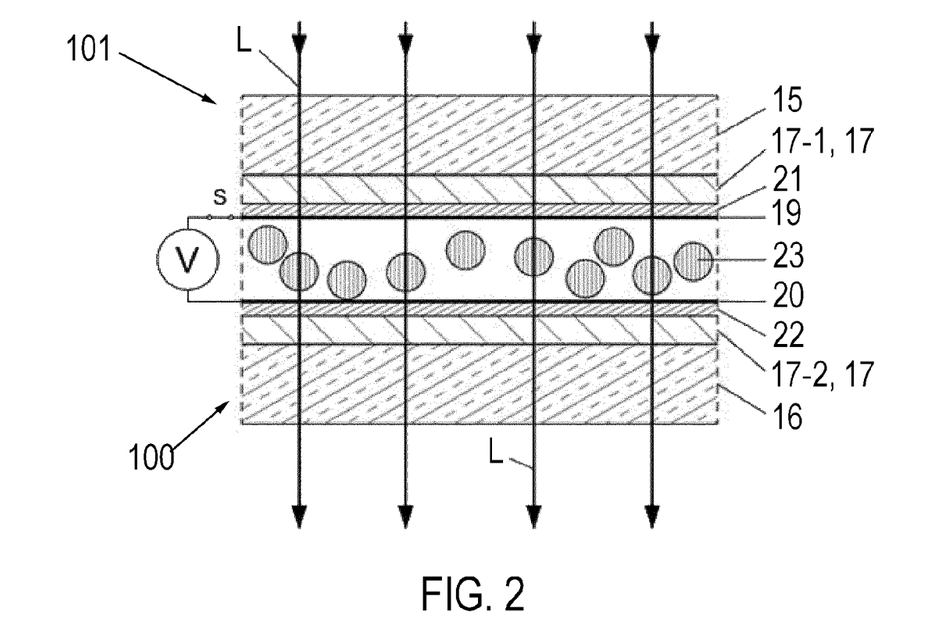

Reference is first made to FIGS. 1 and 2, in which a connection arrangement having a composite pane 100, designated overall with the reference number 101, is illustrated schematically using a sectional view perpendicular to the plane of the pane. The composite pane 100, implemented here, for example, as a windshield of a motor vehicle, comprises a first pane 15, which serves as an outer pane, and a second pane 16, as an inner pane. The inner pane is the pane facing the vehicle interior, while the outer pane faces the vehicle's surroundings. The two panes 15, 16 are made, for example, of soda lime glass. The two panes 15, 16 are fixedly bonded to one another by a thermoplastic intermediate layer 17.

The composite pane 100 is equipped with an electro-optical functional element 18 (see also FIGS. 3 and 4), which is, here, for example, a PDLC functional element. For example, the PDLC functional element serves as an electrically adjustable sun visor, installed in a region above the central viewing region B (as defined in ECE-R43). The PDLC functional element is formed by a commercially available PDLC multilayer film that is embedded in the intermediate layer 17. The intermediate layer 17 comprises a total of three thermoplastic laminating films, formed in each case by a thermoplastic film with a thickness of, for example, 0.38 mm made of PVB. FIGS. 1 and 2 depict only a first thermoplastic laminating film 17-1, which is bonded to the first pane 15, and a second thermoplastic laminating film 17-2, which is bonded to the second pane 16. The interposed thermoplastic frame film (not shown) has a cutout, into which the cut-to-size functional element 18 is inserted with a precise fit, i.e., flush on all sides. The third thermoplastic laminating film thus forms, so to speak, a type of passe-partout for the functional element 18, which is thus encapsulated all around in thermoplastic material and is protected thereby.

Figure 3:
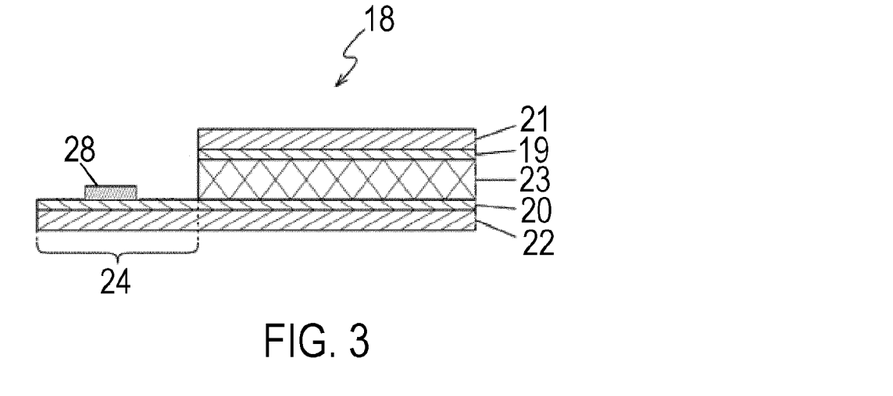

The electrically adjustable functional element 18 is a multilayer film consisting of an active layer 23 between two surface electrodes 19, 20 and two carrier films 21, 22. The active layer 23 contains a polymer matrix with liquid crystals dispersed therein, which align themselves as a function of the electrical voltage S applied to the surface electrodes 19, 20, by which means the optical properties can be adjusted. The carrier films 21, 22 are made, for example, of PET and have a thickness of, for example, 0.125 mm. The carrier films 21, 22 are provided in each case with a coating of ITO with a thickness of roughly 100 nm facing the active layer 23, by which means the first surface electrode 19 is formed on the first carrier film 21 and the second surface electrode 20 is formed on the second carrier film 22.

When no voltage S is applied, the liquid crystals are aligned in a disorderly manner, resulting in strong scattering of the light L passing through the active layer 23. This state is illustrated in FIG. 1. When a voltage S is applied to the surface electrodes 19, 20, the liquid crystals align themselves in a common direction and the transmittance of light L through the active layer 23 is increased. The PDLC functional element acts not so much by reducing the total transmittance but by increasing the scattering. This state is illustrated in FIG. 2.

The two surface electrodes 19, 20 can be connected in each case to the on-board electrical system via bus bars and a single flat cable as a connection cable, which is explained in greater detail below.

Figure 4:
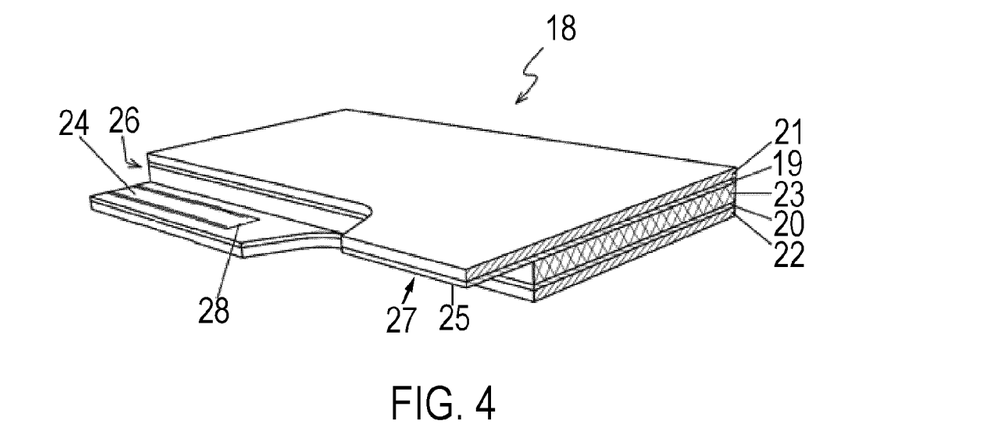

FIG. 4 depicts a perspective view of the functional element 18 of the connection arrangement 101 with composite pane 100 of FIGS. 1 and 2. For the purpose of a simpler representation, only the functional element 18 is shown. As can be discerned in FIG. 4, one long side (longitudinal edge) of the functional element 18 is provided with two connection zones 24, 25 that serve for electrical contacting of the associated surface electrode 20, 19.

The first carrier film 21 and the first surface electrode 19 applied thereon as well as the active layer 23 have, along the longitudinal edge, a first cutout 26, which extends all the way to the second carrier film 22 with the second surface electrode 20 applied thereon. The second surface electrode 20 is, consequently, accessible from the side of the active layer (here, from above). The second carrier film 22 and the second surface electrode 20 form, in the region of the first cutout 26, a first connection zone 24. In a corresponding manner, the second carrier film 22 and the second surface electrode 20 applied thereon as well as the active layer 23 have, along the same longitudinal edge, a second cutout 27, which extends to the first carrier film 21 and the first surface electrode 19 applied thereon. The first surface electrode 19 is, consequently, accessible from the side of the active layer 23 (here, from below). The first carrier film 21 and the first surface electrode 19 form a second connection zone 25 in the region of the second cutout 27.

Each connection zone 24, 25 is provided with a bus bar, which is formed here, for example, by a silver-containing screen print. In FIG. 4, due to the perspective representation, only the bus bar 28 of the first connection zone 24 is discernible, with the bus bar of the second connection zone 25 implemented analogously. The two connection zones 24, 25 are arranged laterally offset along the longitudinal edge of the functional element 18 laterally offset and analogously implemented. The statements made concerning the first connection zone 24 apply mutatis mutandis to the second connection zone 25.

FIG. 3 additionally depicts a section perpendicular through the plane of the pane in the region of the first connection zone 24, which shows the second surface electrode 20 and the second carrier film 22 as well as the bus bar 28 applied thereon.

Figure 5:
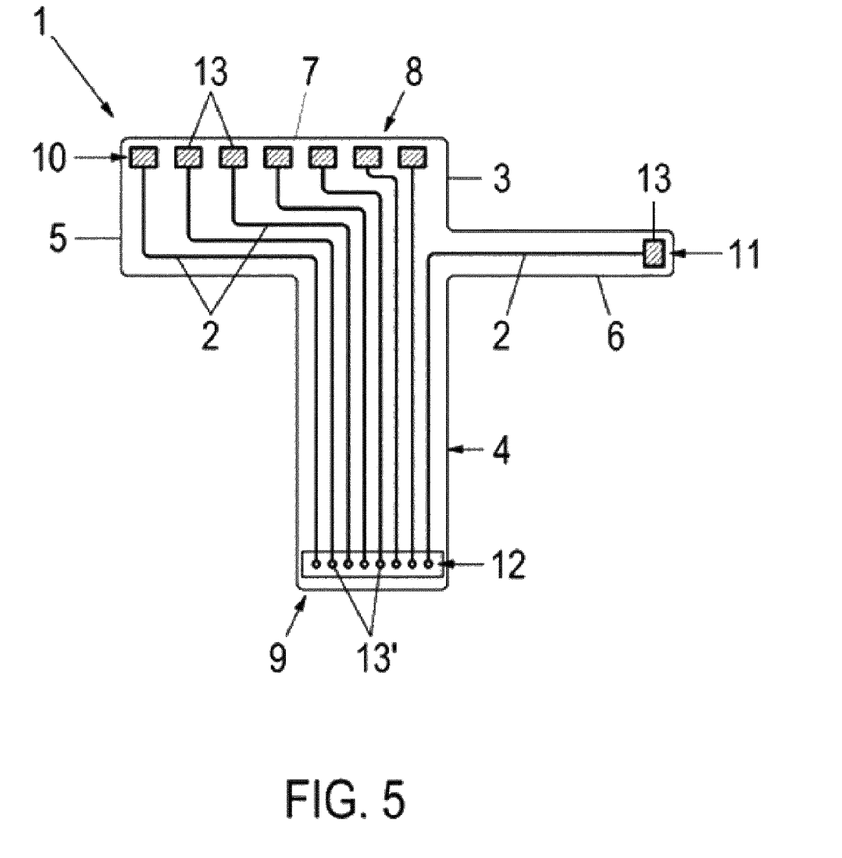
Figure 6:
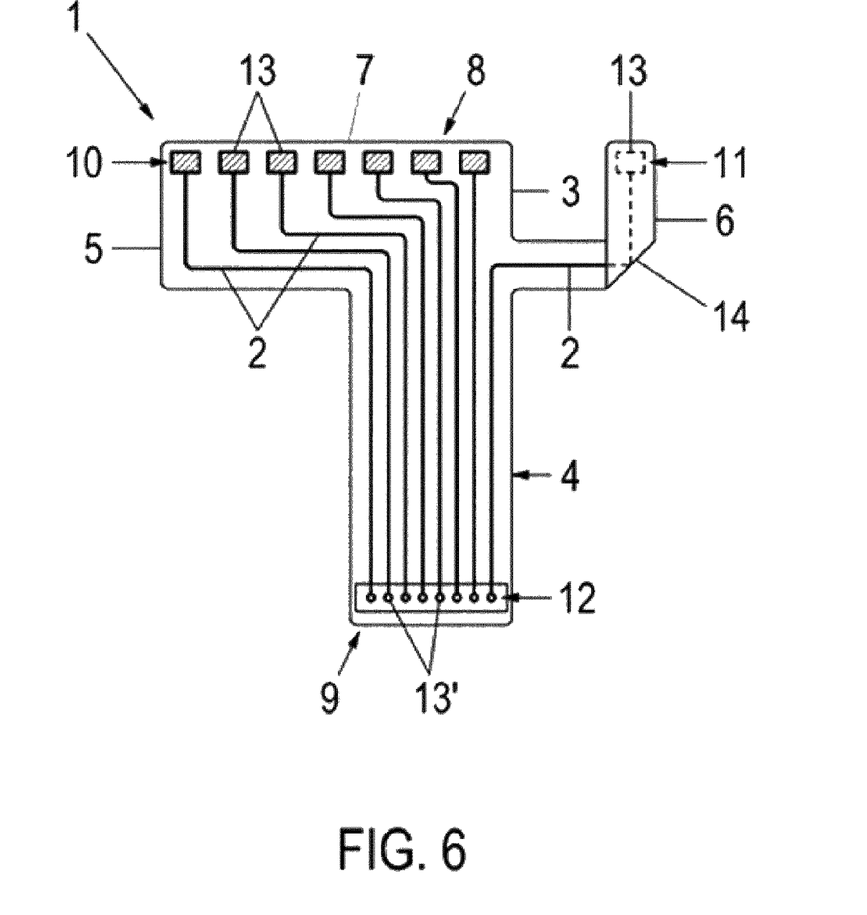

Reference is now made to FIGS. 5 and 6, wherein a flexible flat cable, designated overall with the reference number 1 and having an elongated structure, is illustrated schematically. The flat cable 1 is used for common connection to the two connection zones 24, 25.

The flat cable 1 has a plurality of electrical conductor tracks 2 that are applied next to one another on a carrier substrate 3 made of an electrically insulating material, here, for example, polyimide. The electrical conductor tracks 2 are made of a metallic material, here, for example, copper, and are applied on the carrier substrate 3 using a printing process. The electrical conductor tracks 2 are covered by a covering layer 4 (not shown in greater detail) made of an electrically insulating material, here, for example, polyimide. Together, the carrier substrate and the covering sleeve 4 form an insulating sleeve in which the conductor tracks 2 are embedded.

The flat cable 1 has, for example, a length of 5 cm to 150 cm. The electrical conductor tracks 2 have, for example, a thickness of 10 μm to 300 μm and a width of 0.1 mm to 100 mm. The carrier substrate 3 and the covering layer 4 have in each case, for example, a thickness of 10 μm to 300 μm. The flat cable 1 is flexible and can be readily laminated into the composite pane and routed out of it.

The flexible flat cable 1 has a base section 5 and a strip-like section 6 (strip section), which is (directly) connected to the base section 5 and which is arranged at the edge on the base section 5 and protrudes laterally from the base section 5, here, for example, perpendicularly. It would also be possible for the strip-like section 6 to be formed by a depression of the front edge 7 of the flat cable 1.

The flat cable 1 has, at a first end 8 in the base section 5, a first connection region 10 and, in the strip-like section 6, a second connection region 11. The two connection regions 10, 11 are formed on the same side of the flat conductor 1 and thus do not face one another when the strip-like section 6 is not folded over. The flat cable 1 further has, at its second end 9 in the base section 5, a third connection region 12. The covering layer 4 is removed at the connection regions 10, 11, 12 in each case such that these connection regions 10, 11, 12 are accessible from (only) one side. The flat cable 1 is thus almost completely sheathed by an insulating sleeve made of polyimide and thus electrically isolated. Only the connection regions 10, 11, 12 are implemented without a covering layer 4. This can be achieved, for example, using a window technique during production or by subsequent removal of the covering layer 4, for example, by laser ablation.

The flat cable 1 has, here, for example, eight electrical conductor tracks 2, which are arranged positioned next to one another on the carrier substrate 3. Seven conductor tracks 2 extend from the first connection region 10 of the base section 5 all the way to the third connection region 12 of the base section 5. One conductor track 2 extends from the second connection region 11 of the strip-like section 6 all the way to the third connection region 12 of the base section 5. Each conductor track 2 has a contact point 13 at the first end 8 and a contact point 13' at the second end 9 of the flat cable 1. The contact points 13, 13' are implemented, here, for example, as soldering contact points.

The strip-like section 6 is elongated and can be folded over due to the flexibility of the flat cable 1. FIG. 5 depicts a situation, in which the strip-like section 6 is not folded over, i.e., the surface sections of the carrier substrate 2 [sic: 3] in the region of the base section 5 and of the strip-like section 6, on which the conductor tracks 2 are applied, have the same orientation. This is, for example, the delivery state of the flat cable 1. FIG. 6 depicts a situation in which the strip-like section 6 is folded over in a fold region 14. In the fold region 14, one side of a part of the strip-like section 6 comes to rest on the same side of another part of the strip-like section 6. Here, the angle between the directions of extension of the strip-like section 6 before the fold region 14 and after the fold region 14 is, for example, 90°, such that the distal part of the strip-like section 6, i.e., the folded-over part of the strip-like section 6, and the elongated base section 5 point in the same direction and are parallel to one another. The strip-like section 6 is not folded with sharp edges, but, instead, with a radius of curvature r of 0.1 mm to 100 mm, as a result of which damage to the flat conductor 1 and in particular to the conductor track 2 can be avoided.

The first connection region 10 and the second connection region 11 are arranged on the same side of the flat cable 11. In contrast, in the folded state, as depicted in FIG. 6, the second connection region 11 is rotated by 180° such that the two connection regions 10, 11 face one another, with the second connection region 11 arranged laterally offset relative to the first connection region 10. It would also be possible for the two connection regions 10, 11 to be opposite one another. The first connection region 10 and the second connection region 11 thus have a different orientation.

Figure 7:
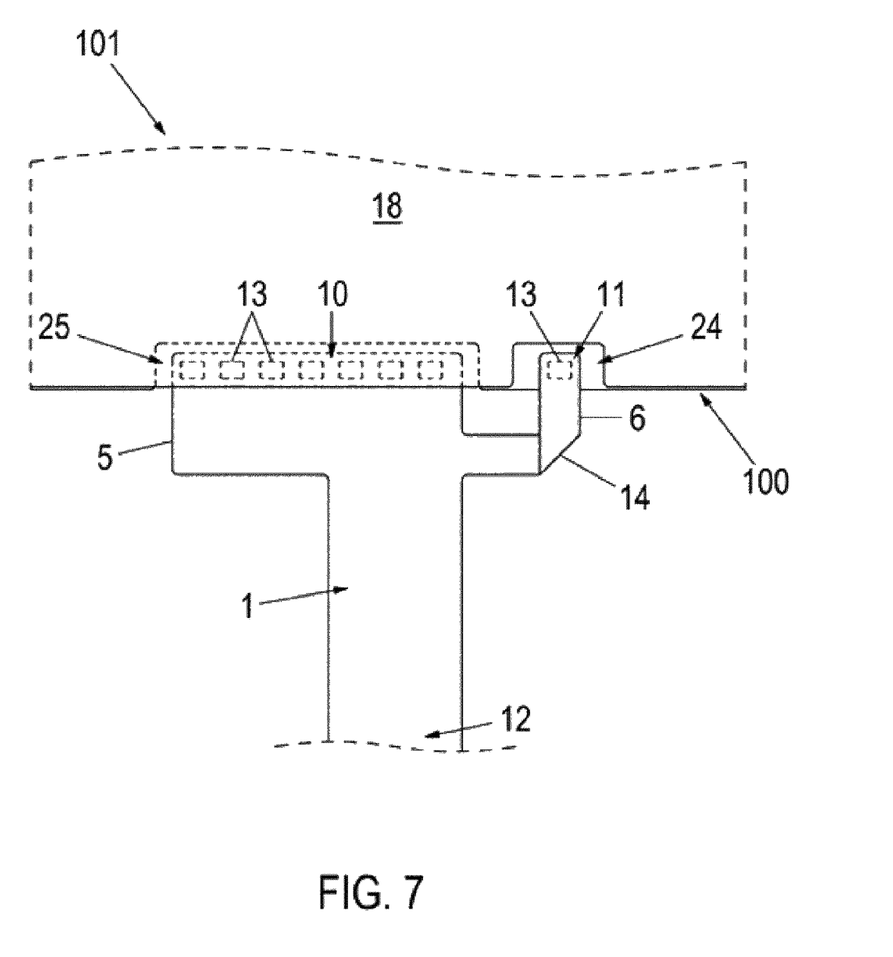

FIG. 7 schematically illustrates the electrical connection of the flat cable 1 to the two connection zones 24, 25 of the functional element 18. Here, the first connection region 10 of the base section 5 is electrically connected directly to the second connection zone 25. The second connection region 11 on the strip-like section 6 rotated by 180° is electrically connected directly to the first connection zone 24. The contact points 13 of the first connection region 10 are soldered to the bus bar 28 of the second connection zone 25 from one side (direction); the contact point 13 of the second connection region 11 is soldered to the bus bar of the first connection zone 24 from the other side (direction). The flat cable 1 according to the invention thus enables electrical contacting of the two connection zones 24, 25 in an advantageous manner.

The flat cable 1 is routed out of the composite pane 100 with its base section 5, wherein the third connection region 12 is arranged outside the composite pane 100 and is electrically connected to a control device, for example, a motor vehicle electronics system. The composite pane 100 with the connected flat cable 1 forms a connection arrangement 101.

Figure 8:
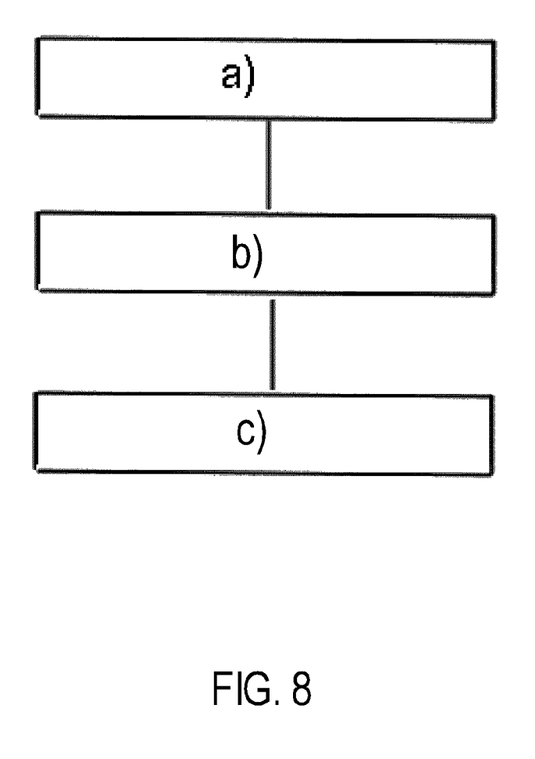

FIG. 8 depicts a flow chart of a method according to the invention for producing the connection arrangement 101 according to the invention.

The method comprises at least the following steps:
a) Providing a flat cable 1,
b) Folding over the strip-like section 6 of the flat cable 1 such that the second connection region 11 faces the first connection region 10,
c) Electrically conductively connecting the first connection region 10 to the first surface electrode 19 and the second connection region 11 to the second surface electrode 20.

It follows from the above statements that the connection arrangement according to the invention advantageously enables simultaneous electrical contacting of two electrically conductive structures, in particular two surface electrodes of an electro-optical functional element, from two directions. The flat cable and the connection arrangement implemented therewith make material and cost savings possible. In addition, the connection arrangement according to the invention saves space and is easy to integrate into the technical environment.

REFERENCE CHARACTERS 1 flat cable
2 conductor track
3 carrier substrate
4 covering layer
5 base section
6 strip-like section
7 front edge
8 first end
9 second end
10 first connection region
11 second connection region
12 third connection region
13, 13' contact point
14 fold region
15 first pane
16 second pane
17 intermediate layer
17-1, 17-2 laminating film
18 functional element
19 first surface electrode
20 second surface electrode
21 first carrier film
22 second carrier film
23 active layer
24 first connection zone
25 second connection zone
26 first cutout
27 second cutout
28 bus bar
100 composite pane
101 connection arrangement

The invention claimed is:

1. A connection arrangement, comprising:
a composite pane composed of a first pane and a second pane, which are connected to an intermediate layer,
two electrically conductive structures that are arranged between the first pane and the second pane, and
a flexible flat cable having a plurality of electrical conductor tracks, comprising:
a first connection region at a first end and on a first side of the flexible flat cable, wherein the first connection region has a contact point of at least one conductor track of the plurality of electrical conductor tracks,
at least one second connection region at the first end and on the first side of the flexible flat cable, wherein the second connection region has a contact point of at least one conductor track of the plurality of electrical conductor tracks,
a third connection region with contact points of the plurality of conductor tracks at a second end of the flat cable,
wherein the flexible flat cable has a base section containing the first connection region and at least one strip-like section connected to the base section and containing the second connection region, wherein the strip-like section is folded or is foldable over at at least one fold region such that the second connection region faces the first connection region,
wherein the first connection region is electrically conductively connected to one electrically conductive structure of the two electrically conductive structures and the second connection region is electrically conductively connected to the other one electrically conductive structure of the two electrically conductive structures, wherein the flexible flat cable is routed out of the composite pane and the third connection region is arranged outside the composite pane,
wherein the strip-like section protrudes laterally from the base section along a direction of lateral extension, and
wherein an angle $\alpha$ between (i) a direction of extension of the strip-like section in front of and from the at least one fold region and (ii) a direction of extension of the strip-like section behind the at least one fold region and oriented toward said at least one fold region is from 10° to 170°, said direction of extension of the strip-like section behind said at least one fold region and oriented toward said at least one fold region corresponding to the direction of lateral extension of the strip-like section from the base section.

2. The connection arrangement according to claim 1, wherein the strip-like section is arranged at an edge on the base section.

3. The connection arrangement according to claim 1, wherein the strip-like section is folded or is foldable such that the second connection region is arranged laterally offset relative to the first connection region.

4. The connection arrangement according to claim 1, wherein the strip-like section is folded or is foldable such that the second connection region is arranged opposite the first connection region.

5. The connection arrangement according to claim 1, wherein a depression of a front edge of the flat cable is formed between the base section and the strip-like section.

6. The connection arrangement according to claim 1, wherein a folded-over part of the strip-like section and the base section point in one and the same direction.

7. The connection arrangement according to claim 1, wherein the plurality of electrical conductor tracks are fixedly connected to a carrier substrate and are covered by a covering layer, wherein the covering layer is not present at least at the contact points of the first connection region and of the second connection region.

8. The connection arrangement according to claim 7, wherein the covering layer is removed at least at the contact points of the first connection region and of the second connection region.

9. The connection arrangement according to claim 1, wherein the plurality of electrical conductor tracks of the flexible flat cable are strip-like electrical conductor tracks that are laminated on both sides.

10. The connection arrangement according to claim 1, wherein the strip-like section is folded over without sharp edges, wherein the fold has a radius of curvature r of 0.1 mm to 100 mm.

11. The connection arrangement according to claim 1, wherein the first connection region electrically contacts a first surface electrode from one side and the second connection region electrically contacts a second surface electrode from the other side.

12. A method for producing the connection arrangement according to claim 1, comprising:

a) providing the flexible flat cable,
b) folding over the strip-like section of the flat cable such that the second connection region faces the first connection region,
c) electrically conductively connecting the first connection region to the one electrically conductive structure and the second connection region to the other electrically conductive structure.

13. A method comprising providing the connection arrangement according to claim 1 in a vehicle, a construction, in furniture, an electrical appliance, or a decorative item for contacting the two electrically conductive structures on or in a single pane safety glass pane or a multi-pane composite glass pane.

14. The method according to claim 13, wherein the at least two electrically conductive structures are two opposite electrodes of an electro-optical functional element.

15. The connection arrangement according to claim 1, wherein the first connection region is galvanically connected to the one electrically conductive structure and the second connection region is galvanically connected to the other electrically conductive structure.

16. The connection arrangement according to claim 1, wherein the strip-like section protrudes laterally from the base section at a right angle.

17. A connection arrangement, comprising:
a composite pane composed of a first pane and a second pane, which are connected to an intermediate layer,
two electrically conductive structures, and
a flexible flat cable having a plurality of electrical conductor tracks, comprising:
  a first connection region at a first end and on a first side of the flexible flat cable, wherein the first connection region has a contact point of at least one conductor track of the plurality of electrical conductor tracks,
  at least one second connection region at the first end and on the first side of the flexible flat cable, wherein the second connection region has a contact point of at least one conductor track of the plurality of electrical conductor tracks,
  a third connection region with contact points of the plurality of conductor tracks at a second end of the flat cable,
wherein the flexible flat cable has a base section containing the first connection region and at least one strip-like section connected to the base section and containing the second connection region, wherein the strip-like section is folded or is foldable over such that the second connection region faces the first connection region,
wherein the first connection region is electrically conductively connected to one electrically conductive structure of the two electrically conductive structures and the second connection region is electrically conductively connected to the other one electrically conductive structure of the two electrically conductive structures, wherein the flexible flat cable is routed out of the composite pane and the third connection region is arranged outside the composite pane,
wherein the two electrically conductive structures are two mutually opposed surface electrodes of an electro-optical functional element that are arranged between the first pane and the second pane,
wherein the strip-like section protrudes laterally from the base section along a direction of lateral extension, and
wherein an angle $\alpha$ between (i) a direction of extension of the strip-like section in front of and from the at least one fold region and (ii) a direction of extension of the strip-like section behind the at least one fold region and oriented toward said at least one fold region is from 10° to 170°, said direction of extension of the strip-like section behind said at least one fold region and oriented toward said at least one fold region corresponding to the direction of lateral extension of the strip-like section from the base section.

* * * * *